Feb. 10, 1931.  J. S. FRYE  1,791,961
VALVE LIFTER
Filed Jan. 17, 1930
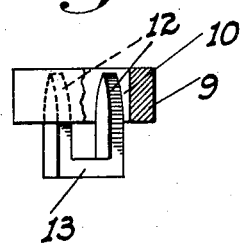
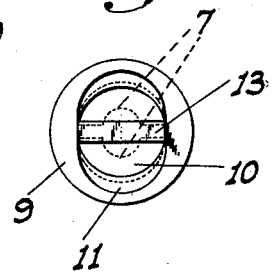
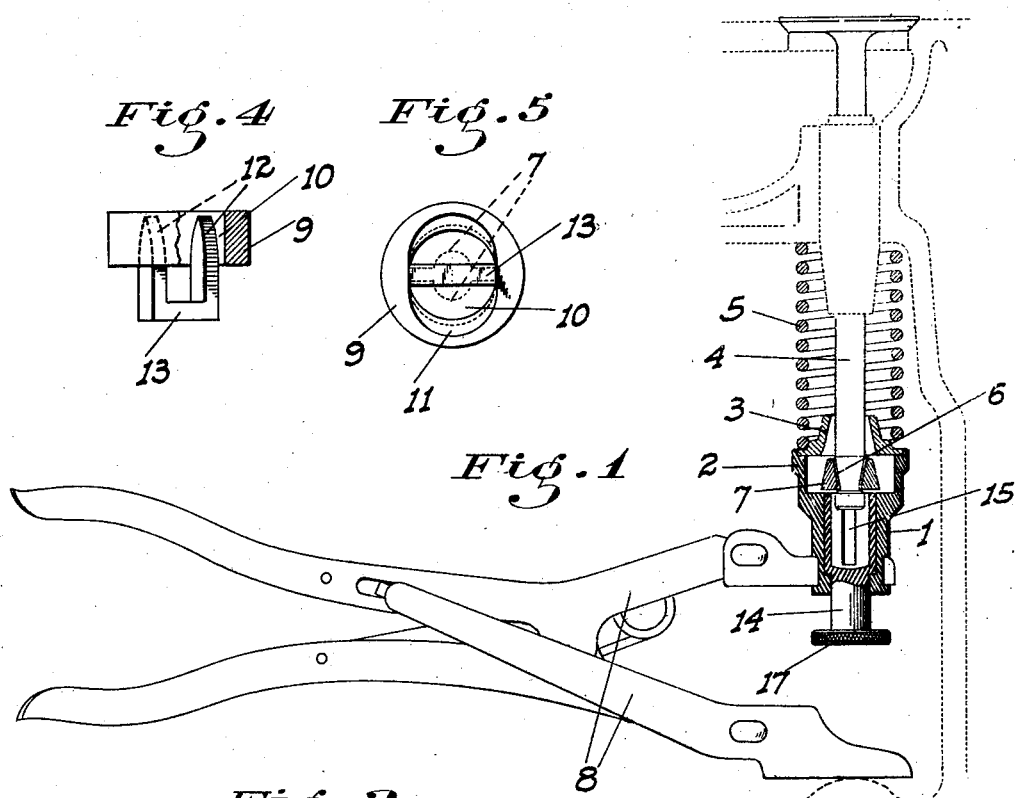
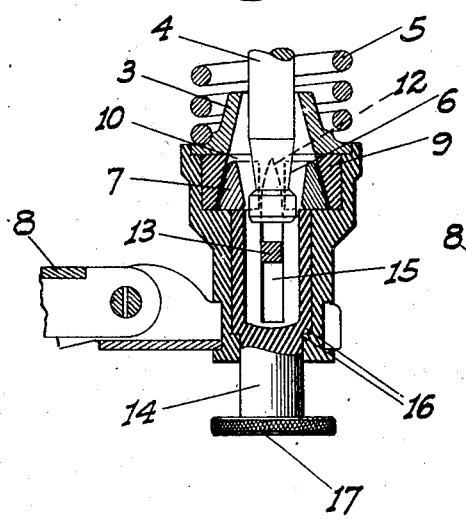
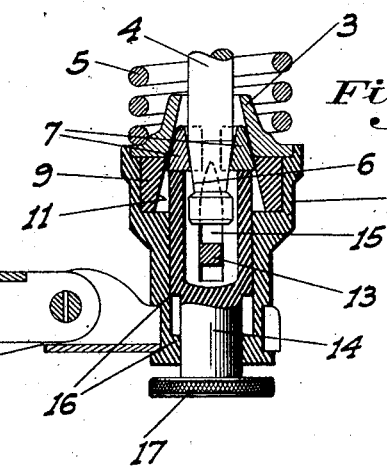
INVENTOR
J. S. Frye
BY
ATTORNEY Patented Feb. 10, 1931

1,791,961

UNITED STATES PATENT OFFICE

JASON S. FRYE, OF SACRAMENTO, CALIFORNIA

VALVE LIFTER

Application filed January 17, 1930. Serial No. 421,467.

This invention relates to tools used in connection with the valves of gas engines to enable the valve stems to be disassociated from their springs and the locking means thereof when it is desired to remove the valves for grinding or replacement.

In engines used on various different makes of motor vehicles the valve spring of each valve is seated in a hollow cone shaped cup which is held in place on the valve stem by a pair of opposed split washers of frusto-conical form, which seat in a groove cut in the valve stem and which are then held in displacement by the cup into which said washers wedgingly fit. The lifting of the cup against the pressure of the spring frees the washers, which then fall out of place of themselves. It is therefore a very easy matter to release the valve stem and remove the valve, but the trouble is that the washers then dropping from place, as above stated, are apt to fall onto the engine parts below and frequently become lost, and cause trouble.

Putting the washers back into place presents greater difficulties, since the cup must be held raised against the pressure of the spring, while the washers are placed in the stem groove and held there until the cup is allowed to drop over the washers to engage and prevent displacement of the same. Owing to the cramped quarters in which the parts are located and to the natural tendency of said washers to drop out of place of themselves it is a hard if not impossible job to successfully hold the washers in place by hand. It is therefore customary to dip said washers in grease before placing them in the groove, so that the stickiness of the grease will temporarily hold the washers in place while the cup is being further manipulated. This operation takes time and frequently gives trouble, and must sometimes be repeated one or more times before the desired results are obtained. The labor costs incident to valve grinding or replacing operations with structures of this type are therefore very high and out of proportion to the character of work actually performed.

The principal object of my invention is to avoid the above named difficulty and objectionable features at present encountered by providing a tool head, usable on various lifting devices, by means of which when it is desired to remove a valve the spring and washer retaining cup may be easily lifted and the washers are then caught and held from dropping; and when it is desired to replace the valve the washers are supported and guided into place in the stem groove at the same time as the retaining cup is first raised and then lowered. Valve removing and replacing operations may therefore be accomplished in an almost instantaneous manner without any trouble and without the danger of the washers dropping out of place or becoming lost.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional elevation of my improved tool head shown in connection with a manipulating or lifting device and operating on a valve to enable the same to be removed.

Fig. 2 is a similar view somewhat enlarged showing the device arranged to support the washers in a replacing position, and as initially operating on the valve and its cooperating parts to replace the washers.

Fig. 3 is a similar view illustrating the final step of replacing the washers.

Fig. 4 is a side view partly broken out showing the washer guiding and locating element of the tool.

Fig. 5 is a bottom plan view of the same.

Referring now more particularly to the characters of reference on the drawings, the numeral 1 denotes the body of the tool head —a tubular member provided on its upper end with an enlarged cup 2. This cup is recessed about its periphery to receive and support the rim if the hollow cone-shaped cup 3 which is slidable on the valve stem 4 and forms the seat for the lower end of the valve spring 5. Adjacent its lower end this stem is provided with a circumferential groove 6, which forms the seat for the pair of vertically split washers 7. The outer sides of these washers have a slope corresponding to that of the bore of the cup 3 and are adapted to fit part way into the same, so that when a downward pressure is exerted on the cup it tends to wedgingly engage the washers and hold the same snugly in their retaining groove in the stem.

The body 1 is rigidly fixed on one end of a suitable lever or lifting device, being preferably mounted on the outer end of one arm of a standard valve lifting tool which consists essentially of a pair of crossed arms 8 pivoted together intermediate their ends. The arms at the ends to which the body is fixed are adapted to project between the valve stem and a rigid engine part below, so that while one arm is engaged with said part the body may be engaged with the valve spring cup. On bringing the opposite ends of the arms together therefore the body will be raised and the valve spring will be compressed, the top being raised clear of the washers so that the latter drop from about the stem and into the cup 2 where they are of course retained against dropping further. The valve stem is therefore free of the spring and the retaining cup and can easily be removed.

The above parts therefore are all that are needed as far as the removal of the valve is concerned. When replacing the valve and washers however additional parts are necessary and are provided as follows:

Adapted to removably seat in the bottom of the cup 2 is a ring 9 whose bore 10 is circular on top and of sufficient diameter to freely receive the washers 7 therein, being substantially the same size as the bottom bore of the cone portion of the cup 3. Said bore 10 however flares outwardly toward the bottom at its opposite ends as shown at 11, so that said bore is of oblong form at the bottom. Depending from inside the ring and disposed in opposed relation to each other at the minor axis of the bore 10 are fingers 12, extending to adjacent the top of the ring and having their opposite sides sloping toward each other at the top, as shown in Fig. 4. These fingers are joined at the bottom some distance below the bottom of the ring by a cross bar 13.

Slidable in the body below the cup 2 is a plunger 14, bored out to receive the valve stem and slotted down its sides a certain distance from the top as at 15 to receive the cross arm and finger unit which fits freely in the bore of the body occupied by the plunger. The top of the plunger is normally on a level with the bottom of the cup 2 and is held against further downward movement by cooperating shoulders 16 on the plunger and body. The bottom of the plunger, which is normally some distance below the body, is provided with a flat head 17 of suitable form which serves as a finger presser member and also limits the upward movement of the plunger.

In operation when it is desired to replace the washers in position about the valve stem, the ring 9 is first inserted in the cup 2, with the cross bar 13 down and so that it engages the slot 15. The washer elements are then inserted in the ring to the sides of the fingers which hold them in spaced relation; said washers being disposed so that they face upwardly in their normal positions and rest on the bottom of the cup 2 and also on the top of the plunger 14. The cup 3 is then seated in position in the recess of the cup 2. Assuming that the valve stem is in position in the engine block the spring 5 is placed thereabout and temporarily held in position while the tool is manipulated so that the cup 3 passes over the lower end of the valve stem and engages the spring. A further raising of the tool compresses the spring, this raising movement being limited by the engagement of the stem with the cross bar 13, though it is not necessary to raise the cup this far after experience has dictated the amount of raising actually necessary to obtain the desired results. When the spring has been compressed and the cup 3 raised the necessary distance it is held raised while the plunger 14 is pressed upwardly with one finger. This movement of the plunger raises the washers relative to the cup and at the same time brings them together somewhat owing to the overhanging slope of the bore of the ring against which the washers bear. The washers are therefore forced to enter the cup 3, which continues to bring them together or into the stem groove. If the groove is not then exactly lined up with the cup 3 a lowering of the tool while holding the plunger immovable relative to said tool will at once cause the washers to be finally pressed into the groove by the downward movement of the cup 3 and its inward wedging action on the washers. The plunger is then released and the tool withdrawn.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A lifter for a valve having a hollow spring-seating cup slidable thereon, and vertically split washers adapted to surround and engage a circumferential groove in the stem of the valve, said washers being independent of but held in place about the groove by said cup; said lifter including a body adapted to be engaged with the cup to enable the same to be slid along the stem, lifting jaws associated with the body, means in the body for supporting the washers in position so that they will also be disposed about the stem in spaced relation to the cup, and instrumentalities in the body for then lifting the washers and at the same time causing them to be contracted about the stem without further moving the cup.

2. A lifter for a valve having a hollow spring-seating cup slidable thereon, and vertically split washers adapted to surround and engage a circumferential groove in the stem of the valve, said washers being independent of but held in place about the groove by said cup; said lifter including a body adapted to be engaged with the cup to enable the same to be slid along the stem, lifting jaws associated with the body, means in the body for supporting the washers in position so that they will also be disposed about the stem in spaced relation to the cup, means in the body for lifting the washers without further moving the cup, and means for causing the washers to also move toward each other so as to cause them to enter the cup and closely engage the stem.

3. A lifter for a valve having a hollow spring-seating cup slidable thereon, and vertically split washers adapted to surround and engage a circumferential groove in the stem of the valve, said washers being independent of but held in place about the groove by said cup; said lifter including a body formed with a cup on its upper end adapted to engage and support the spring retaining cup at its rim; the washers being adapted to rest on the bottom of the body-cup, lifting jaws associated with the body, means in the body holding the washers in spaced relation to each other, and means slidable lengthwise in the body below the cup thereof for engagement with the washers to raise the same relative to said cup.

4. A structure as in claim 3, with means formed as a unit with said washer spacing means for limiting the extent to which the spring retaining cup may be lifted along the valve stem with the corresponding movement of the body.

5. A structure as in claim 3 with means formed as a unit with said washer spacing means for causing the washers, as they are thus raised, to be also moved toward each other.

6. A lifter for a valve having a hollow spring-seating cup slidable thereon, and vertically split washers adapted to surround and engage a circumferential groove in the stem of the valve, said washers being independent of but held in place about the groove by said cup; said lifter including a body formed with a cup on its upper end adapted to engage and support the spring retaining cup at its rim; the washers being adapted to rest on the bottom of the body-cup, lifting jaws associated with the body, a ring removably mounted in the body-cup to receive the washers therein, the bore of said ring at the top being substantially the same as that of the spring-seating cup at the bottom; the ring-bore tapering outwardly and downwardly at its opposite ends, opposed fingers depending from inside the ring midway between said ends, to hold the washers in spaced relation to each other, and means in the body below the ring for raising the washers from their seated position in the body-cup.

7. A lifter for a valve having a hollow spring-seating cup slidable thereon, and vertically split washers adapted to surround and engage a circumferential groove in the stem of the valve, said washers being independent of but held in place about the groove by said cup; said lifter including a body formed with a cup on its upper end adapted to engage and support the spring retaining cup at its rim; the washers being adapted to rest on the bottom of the body-cup, lifting jaws associated with the body, a ring removably mounted in the body-cup to receive the washers therein, the bore of said ring at the top being substantially the same as that of the spring-seating cup at the bottom; the ring-bore tapering outwardly and downwardly at its opposite ends, opposed fingers depending from inside the ring midway between said ends, to hold the washers in spaced relation to each other, a crossbar connecting the lower ends of the fingers, and a tubular plunger slidably mounted in the body below the cup thereof, said plunger being slotted from the top down to slidably receive the crossbar.

In testimony whereof I affix my signature.

JASON S. FRYE.